United States Patent
Trainham

(10) Patent No.: US 12,097,772 B2
(45) Date of Patent: Sep. 24, 2024

(54) SYSTEMS AND METHODS FOR CONTROLLING SPEED DIFFERENTIAL OF WHEELS OF A VEHICLE

(71) Applicant: Rivian IP Holdings, LLC, Plymouth, MI (US)

(72) Inventor: Matthew Trainham, Rancho Santa Margarita, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 200 days.

(21) Appl. No.: 17/376,467

(22) Filed: Jul. 15, 2021

(65) Prior Publication Data

US 2023/0021908 A1 Jan. 26, 2023

(51) Int. Cl.
*B60L 15/20* (2006.01)
*B62D 9/00* (2006.01)

(52) U.S. Cl.
CPC .......... *B60L 15/2036* (2013.01); *B62D 9/002* (2013.01); *B60L 2240/12* (2013.01); *B60L 2240/24* (2013.01); *B60L 2240/423* (2013.01)

(58) Field of Classification Search
CPC ............. B60L 15/2036; B60L 2220/42; B60L 2220/46; B60L 2240/12; B60L 2240/24; B60L 2240/423; B60L 2260/28; B62D 9/002; H02P 5/00; H02P 6/04
See application file for complete search history.

(56) References Cited

U.S. PATENT DOCUMENTS

| | | | |
|---|---|---|---|
| 2008/0264709 A1* | 10/2008 | Fenker | B60W 30/18172 180/197 |
| 2009/0054202 A1* | 2/2009 | Yamakado | B60K 6/52 477/6 |
| 2013/0211678 A1* | 8/2013 | Lee | B60W 10/20 701/42 |
| 2015/0283918 A1* | 10/2015 | Honda | B60K 7/0007 903/909 |
| 2016/0236589 A1* | 8/2016 | Sikand | B60L 15/2036 |
| 2017/0113572 A1* | 4/2017 | Lai | B60L 50/60 |
| 2017/0183008 A1* | 6/2017 | Isono | B60W 30/18172 |
| 2021/0253101 A1* | 8/2021 | Nahrwold | B60W 10/14 |
| 2021/0309114 A1* | 10/2021 | Nordmann | B60K 6/52 |

FOREIGN PATENT DOCUMENTS

| | | | | |
|---|---|---|---|---|
| CN | 110667402 A | * | 1/2020 | .......... B60L 15/2036 |
| CN | 107650677 B | * | 5/2020 | ............. B60K 17/16 |

OTHER PUBLICATIONS

English Translation of CN 107650677 B (Year: 2020).*
English Translation of CN 110667402 A (Year: 2020).*

* cited by examiner

*Primary Examiner* — Anshul Sood
(74) *Attorney, Agent, or Firm* — Haley Guiliano LLP

(57) ABSTRACT

Systems and methods are provided herein for controlling the speed differential of wheels of a vehicle. The vehicle determines a wheel steering angle, where the wheel steering angle corresponds to a center of rotation of the vehicle. The vehicle determines a differential wheel speed associated with a first wheel of the vehicle and a second wheel of the vehicle based at least on the wheel steering angle. The vehicle independently applies torque to the first and second wheels based on the differential wheel speed.

20 Claims, 6 Drawing Sheets

SYSTEMS AND METHODS FOR CONTROLLING SPEED DIFFERENTIAL OF WHEELS OF A VEHICLE

It is advantageous to provide locking differentials to ensure that each wheel is capable of receiving a maximum torque/power of a vehicle motor, depending on surface conditions; however, locked differentials impede the turn response of the vehicle due to drivetrain binding, as two or all four drive wheels are locked together and cannot turn at any varying speed. For example, while turning, a vehicle employing a locking differential results in the same speed for each wheel which in turn causes resistance to the steering input.

In another aspect, the vehicle, in response to the locking differential, reduces stability when driving on very low friction surfaces by creating excess wheel slip, reducing lateral acceleration potential. Consequently, what is needed is an improved turning capability that enables the vehicle to follow the vehicle's turning path with a controlled speed differential at each wheel.

SUMMARY

Accordingly, in some embodiments, it would be advantageous to provide a system that controls the speed differential between wheels on a vehicle and adjusts torque to the wheels to reduce resistance to steering input. Additionally, in some embodiments, it would be advantageous to provide a system that determines speed targets for the wheels of the vehicle and adjusts torque to the wheels to provide stability when driving to limit or prevent wheel slip while turning.

In accordance with the present disclosure, methods employing control circuitry for controlling speed differential and a vehicle including control circuitry for controlling speed differential are provided. The speed differential method controls the speed differential of wheels of a vehicle to improve the turning operation of a vehicle. The control circuitry determines the wheel steering angle of the vehicle. The wheel steering angle affects a center of rotation of the vehicle (e.g., based on the geometry of the vehicle). The control circuitry determines a differential wheel speed between a first wheel of the vehicle and a second wheel of the vehicle based on the wheel steering angle. The first wheel and the second wheel are at different distances away from the center of rotation defined by the wheel steering angle. The control circuitry independently applies torque to the first and second wheels based on the differential wheel speed. By independently applying torque to the first wheel and the second wheel, improved turning capability may be achieved, the vehicle maintains a desired path of travel, and resistance to steering input may be limited or prevented. That is, the vehicle maintains a vehicle speed, while the individual wheel speeds of the wheels will vary based on the geometry of the vehicle (e.g., wheelbase, track of the vehicle, and turning angle of the tires). Further, the present disclosure performs speed control of each wheel based on the differential wheel speeds and the steering angle. The vehicle may transition from, and to, speed control, when the vehicle is being driven straight. The vehicle can maintain the same vehicle speed between transitions and when in speed control mode the speed can be adjusted up or down based on accelerator pedal input.

In some embodiments, the control circuitry may determine the differential wheel speed by determining a first target wheel speed for the first wheel and a second target wheel speed for the second wheel. In some embodiments, the control circuitry determines the first and second target wheel speeds based on one or more of 1) wheel steering angle, 2) center of rotation, 3) distance of first wheel to center of rotation, 4) distance of second wheel to center of rotation, and/or 5) vehicle speed. In some embodiments, the control circuitry may independently apply torque to the first and second wheels by applying a first torque to the first wheel to achieve the first target wheel speed and a second torque to the second wheel to achieve the second target wheel speed. In some embodiments, the first torque differs from the second torque.

In some embodiments, the vehicle may include a first motor configured to provide the first torque to the first wheel and coupled to the control circuitry. In some embodiments, the vehicle may further include a second motor configured to provide the second torque to the second wheel and coupled to the control circuitry. In some embodiments, the first motor differs from the second motor.

In some embodiments, the vehicle may include four wheels. The four wheels may include a first wheel, a second wheel, a third wheel, and a fourth wheel. In some aspects of this disclosure, the control circuitry may determine the differential wheel speed by determining differential wheel speeds between the four wheels. In some embodiments, the control circuitry determines the differential wheel speed by determining a respective target wheel speed for each of the first wheel, the second wheel, the third wheel and the fourth wheel. In some embodiments, the control circuitry may independently apply torque by independently applying torque to each of the four wheels based on the differential wheel speeds. In some embodiments, the control circuitry may independently apply torque by independently applying torque to each of the four wheels based on the respective target wheel speeds.

In some embodiments, the vehicle may include four motors, each configured to independently provide torque to a respective wheel. In some embodiments, the four motors may be configured to independently provide torque to a respective wheel based on the respective target wheel speeds. The four motors may each be coupled to a respective motor shaft configured to provide torque/power to each respective wheel.

In some embodiments, each of the four motors of the vehicle may include an electric motor. Each electric motor may include a motor shaft configured to provide torque/power to each respective wheel. In some embodiments, the control circuitry may determine the differential wheel speeds between the four wheels by determining a first target wheel speed for the first wheel, a second target wheel speed for the second wheel, a third target wheel speed for the third wheel and a fourth target wheel speed for the fourth wheel. In some embodiments, the control circuitry may monitor signals from sensors coupled to the motor shafts of the four electric motors. Each sensor may indicate an amount of rotation of a respective motor shaft. In some embodiments, the control circuitry may calculate a respective wheel speed for each respective wheel based on a respective signal of the monitored signals. In response to the calculated respective wheel speed for each respective wheel, the control circuitry may adjust torque to each respective wheel to achieve each respective target wheel speed.

In some embodiments, the control circuitry may receive an accelerator pedal input that determines a vehicle target speed. In some embodiments, the control circuitry system may determine the differential wheel speed by determining the differential wheel speed between the first wheel of the vehicle and the second wheel of the vehicle based on the vehicle target speed and the wheel steering angle.

In some embodiments, the first wheel of the vehicle is positioned in the front of the vehicle on a first side of the vehicle, and the second wheel of the vehicle is positioned in the rear of the vehicle on a second side of the vehicle. The first side of the vehicle may be on the opposite side of the second side of the vehicle. In some embodiments, the control circuitry may identify a turn direction based on the wheel steering angle. In response to identifying a right turn direction, where the first side of the vehicle is the right side of the vehicle, the control circuitry may adjust the differential wheel speed between the first and the second wheels of the vehicle up to 80% based on the wheel steering angle. In response to identifying a left turn direction, where the first side of the vehicle is a right side of the vehicle, the control circuitry may adjust the differential wheel speed between the first and the second wheels of the vehicle up to 15% based on the wheel steering angle.

In some embodiments, the control circuitry may determine the wheel steering angle by determining the wheel steering angle of the vehicle exceeds a first wheel steering angle threshold. In some embodiments, the control circuitry may independently apply torque to the first and second wheels by applying a first torque to the first wheel based on the wheel steering angle exceeding the first wheel steering angle threshold and applying a second torque to the second wheel based on the wheel steering angle exceeding the first wheel steering angle threshold. In some embodiments, the first torque differs from the second torque. The control circuitry may further determine the wheel steering angle of the vehicle exceeds a second wheel steering angle threshold. In some embodiments, the control circuitry may provide an overcompensation turning factor to the first and second wheels based on the wheel steering angle of the vehicle exceeding the second wheel steering angle threshold.

In some embodiments, the control circuitry may determine a turning path for each wheel of the vehicle based on the wheel steering angle. The turning path of the vehicle affects a travel path of each of the wheels of the vehicle. In some embodiments, the control circuitry may adjust the differential wheel speed for each respective wheel of the wheels of the vehicle based on the determined respective turning path. Controlling speed differential can be performed in various vehicles described herein capable of distributing torque and/or braking to each of one or more of the wheels of the vehicle.

In some embodiments, the vehicle includes an independent four motor drive system. The vehicle employs a controlled speed differential in some embodiments, thereby avoiding locking wheel differentials, including 'locking wheel speeds' to maximize traction. In some embodiments, the vehicle employs input from the steering wheel angle sensor, to determine the ideal speed for each wheel as a function of a corner, or path radius (from a 0% wheel speed differential when steering straight, up to a nearly 80% differential when turning at full lock. This aspect of this embodiment allows adjustment of motor speed targets when operating in a Crawl mode (motor/wheel/vehicle speed control as a function of the accelerator pedal position, instead of requested torque output) to maintain the target vehicle speed but at an optimized wheel speed for each wheel to maximize both traction and operator control with the ideal path following at any steering angle. In some embodiments, the vehicle may additionally increase maneuverability by one or both inside wheels being under-driven vs. their ideal speed targets to further sharpen vehicle turning, emulating the function of a cutting brake.

In some embodiments, a control method that capitalizes on the independent, four-motor powertrain system to overcome the inherent shortcomings (namely, resistance to vehicle yaw/turning response with steering inputs) of typically limited-slip and mechanical locking differentials. In some embodiments, operating the vehicle in a 'Crawl' mode or any other more, where the driver's accelerator pedal request is effectively translated into a wheel/vehicle speed for increased controllability by modifying each wheel individually, using input from the steering angle sensor. Based on the driver's intended path, wheel speeds could be controlled to deliver the proper 'differential' in speed, not only from inside to outside wheels but also from front to rear wheels. In some embodiments, the first side of the vehicle is the left side of the vehicle and the second side of the vehicle is the right side of the vehicle. Each tire needs to follow an increasingly 'different' path diameter and resultant wheel speed as the steering angle increases in some embodiments. In some embodiments, controlling the speed differential results in maximum potential traction and drive, as well as maintains the operator's desired path of travel. In some embodiments, controlling the speed differential may be 'overdriven' by increasing outside wheel speeds (or reducing inside wheel speeds or both) to induce additional yaw through both additional outer wheel torque vectoring or inner wheel reverse torque vectoring; emulating the function of a manual 'cutting brake'; with the terminal or ultimate version of this becoming effectively equal to a zero-turn radius (or a tank turn).

In some implementations, the techniques described below may be performed by processing circuitry of a vehicle. The processing circuitry may be implemented as a part of a vehicle, included in the vehicle, and/or embedded in the vehicle electronics, among other possibilities. In some embodiments, the processing circuitry may include an onboard vehicle computer that can control multiple features or capabilities of the vehicle. In some embodiments, the processing circuitry may be communicatively connected with user inputs of the vehicle, sensors of the vehicle, and transitory or non-transitory memory (e.g., memory-storing institutions for operating the vehicle).

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
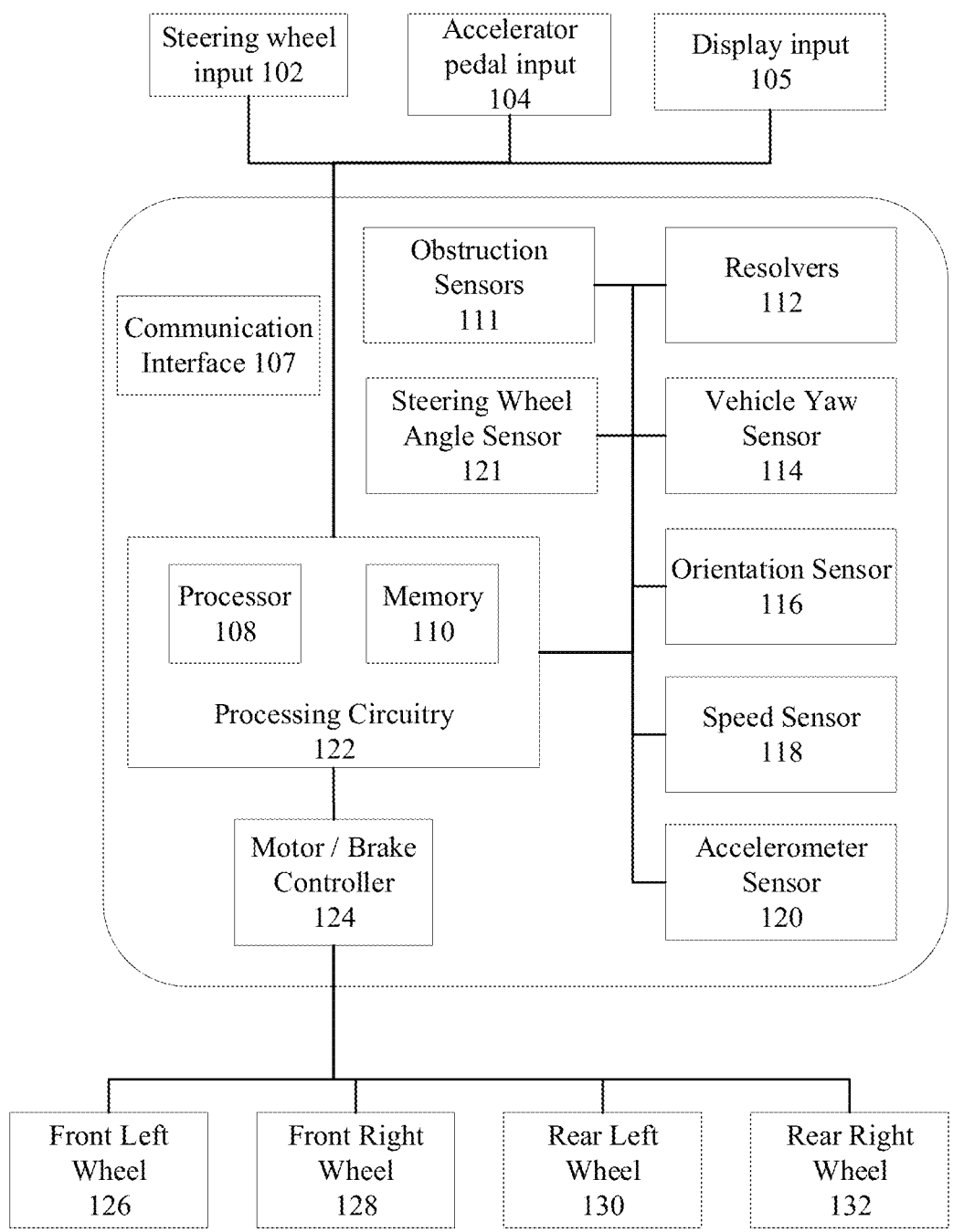
FIG. 1 depicts a system diagram of an illustrative vehicle including processing circuitry, inputs variables, sensors and output variables, in accordance with some embodiments of the present disclosure.

FIG. 1 depicts a system diagram of an illustrative vehicle 100 including processing circuitry 122, input variables 102, 104, 105, sensors 111-121, motor/brake controller 124 and output variables 126-132, in accordance with several embodiments of the disclosure. Illustrative processing circuitry 122 includes processor 108, and memory 110.

Processing circuitry 122 may include hardware, software, or both, implemented on one or more modules configured to provide control of front wheels and rear wheels of a vehicle. In some embodiments, processor 108 includes one or more microprocessors, microcontrollers, digital signal processors, programmable logic devices, field-programmable gate arrays (FPGAs), application-specific integrated circuits (ASICs), or any suitable combination thereof. In some embodiments, processor 108 is distributed across more than one processor or processing units. In some embodiments, processing circuitry 122 executes instructions stored in memory for managing a quad motor vehicle 300, or a triple motor vehicle. In some embodiments, memory 110 is an electronic storage device that is part of processing circuitry 122. For example, memory 110 may be configured to store electronic data, computer instructions, applications, firmware, or any other suitable information. In some embodiments, memory 110 includes random-access memory, read-only memory, hard drives, optical drives, solid-state devices, or any other suitable memory storage devices, or any combination thereof. For example, memory may be used to launch a start-up routine.

In some embodiments, the system may include at least the following non-limiting inputs including steering input 102, accelerator pedal input 104, and display input 105. In some embodiments, steering wheel input 102 may be configured to provide input for turning the steerable wheels. For example, the steering input may cause the control circuitry to determine a wheel steering angle of the vehicle. The wheel steering angle affects a center of rotation of the vehicle along a travel path of the vehicle (e.g., based on the geometry of the vehicle). In some embodiments, the accelerator pedal input 104 may be configured to provide an input for the throttle to one or more of wheels 126, 128, 130, 132 of vehicle 100. For example, an accelerator pedal input may be transmitted to one or more motor(s) to provide torque to one or more of wheels 126, 128, 130, 132. For example, when an accelerator pedal is pressed and an accelerator pedal input is received. This causes torque to be generated at the wheels which results in acceleration of the vehicle to a speed such that the torque is balanced with the overall resistive forces of the vehicle. In some embodiments, the vehicle may have 2 motors, one per side of the vehicle (e.g., left side and right side), as a result, the torque is generally the same to each wheel. In some embodiments, the input interface 105 (e.g., a graphical user interface) may be configured to receive and output information related to the vehicle including travel path and differential wheel speeds. In some embodiments, the input interface is configured to receive an input from an operator of the vehicle to engage a differential speed control and indicate a yaw direction. In some embodiments, the input to engage the differential speed control may be engaged with the input interface 105 or as another button, paddle shifter or any other way.

In some embodiments, the system may include obstruction detection sensors 111, wheel rotation sensors 112, vehicle yaw sensors 114, orientation sensors 116, speed sensor 118, accelerometer sensor 120 and steering wheel sensor 121. In some embodiments, the processing circuitry 122 may be communicatively connected to one or more obstruction detection sensors 111 to monitor for obstructions around the vehicle. In some embodiments, the processing circuitry 122 may be communicatively connected to one or more wheel rotation sensors 112 (e.g., resolvers) that provide data indicative of the wheel rotation of each of wheels 126, 128, 130, 132 of the vehicle, i.e., how fast the wheels of the vehicle are spinning. In some embodiments, the processing circuitry 122 may be communicatively connected to one or more steering wheel angle sensors 121 that provide data indicative of a steering column of the vehicle 200 to determine a steering angle of the steerable wheels 126 and 128. In some embodiments, as a wheel steering angle of the vehicle is determined, the control circuitry determines a turning path of each wheel based on its respective distance from the center of rotation of the vehicle. In some embodiments, the surface friction under each wheel may be different, where the torque applied to each wheel to achieve the speed differential may dynamically change. In some embodiments, based on the data provided by the wheel rotation sensor 112, the processing circuitry 122 may determine if a wheel is slipping while in a turn and, in response, may adjust the torque applied to the wheel slipping based on the wheel being on a lower friction surface. In some embodiments, the processing circuitry 122 may be communicatively connected to one or more vehicle yaw sensors 114 that provide data indicative of the vehicle's rotation. In some embodiments, the processing circuitry 122 may be communicatively connected to one or more orientation sensors 116 that provide data indicative of the orientation of vehicle 200 in 3D space. For example, orientation sensors 116 may provide data indicative of a pitch angle of vehicle 200, yaw angle of vehicle 200, and roll angle of vehicle 200. In some embodiments, the vehicle yaw or yaw rate may be determined by one or more orientation sensors 116. In some embodiments, the vehicle yaw or yaw rate may be determined by steering wheel input 102. The orientation sensors 116 may provide data indicative of the orientation of vehicle 200. The yaw rate can be determined by calculating a change in orientation over time. In some embodiments, the processing circuitry 122 may be communicatively connected to a speed sensor 118 that provides the current speed of vehicle 200. In some embodiments, the processing circuitry 122 may be communicatively connected to an accelerometer sensor 120 that provides the current acceleration of vehicle 200. In some embodiments, the processing circuitry 122 may be communicatively connected to a steering wheel angle sensor 121 that determines the wheel steering angle of the steerable wheels (e.g., 126 and 128) of vehicle 200. In some embodiments, in response to determining the wheel steering angle of the steerable wheels with the steering wheel sensor 121, the processing circuitry 122 may determine a turning path of each of the wheels of the vehicle. Based on the determined turning path of the wheels of the vehicle, the control circuitry may determine a differential wheel speed for the wheels of the vehicle. For example, a first wheel may have a wheel speed that is 40% higher than a second wheel. In some embodiments, the determined wheel steering angle may be compared to threshold angle (e.g., 10 degrees) to engage differential speed control. In some embodiments, without engaging the differential speed control and responding to the determined wheel steering angle that exceeds the threshold angle, the processing circuitry 122 may independently apply torque to wheels to improve stability when driving on very low friction surfaces to prevent excessive wheel slip. In some embodiments, in response to engaging differential wheel speed, the vehicle 100 may automatically apply torque to the wheels of the vehicle (e.g., without receiving additional input from the accelerator pedal) based on the steering wheel angle. In some embodiments, if the vehicle target speed is 50 mph but the steering wheel angle is too large to achieve that vehicle target speed, then the target wheel speeds gradually increase as the steering wheel angle is normalized to then achieve the vehicle target speed. In some embodiments, without engaging a differential speed control, the control circuitry adjusts the torque to the wheels of the vehicle. For example, as the vehicle is receiving an accelerator pedal input and is traveling at 5 miles per hour (mph), the operator of the vehicle turns the steering wheel, causing a steering wheel angle of 20 degrees, and in response, the control circuitry automatically adjusts the torque independently to each wheel without receiving any new accelerator pedal input.

Figure 6:
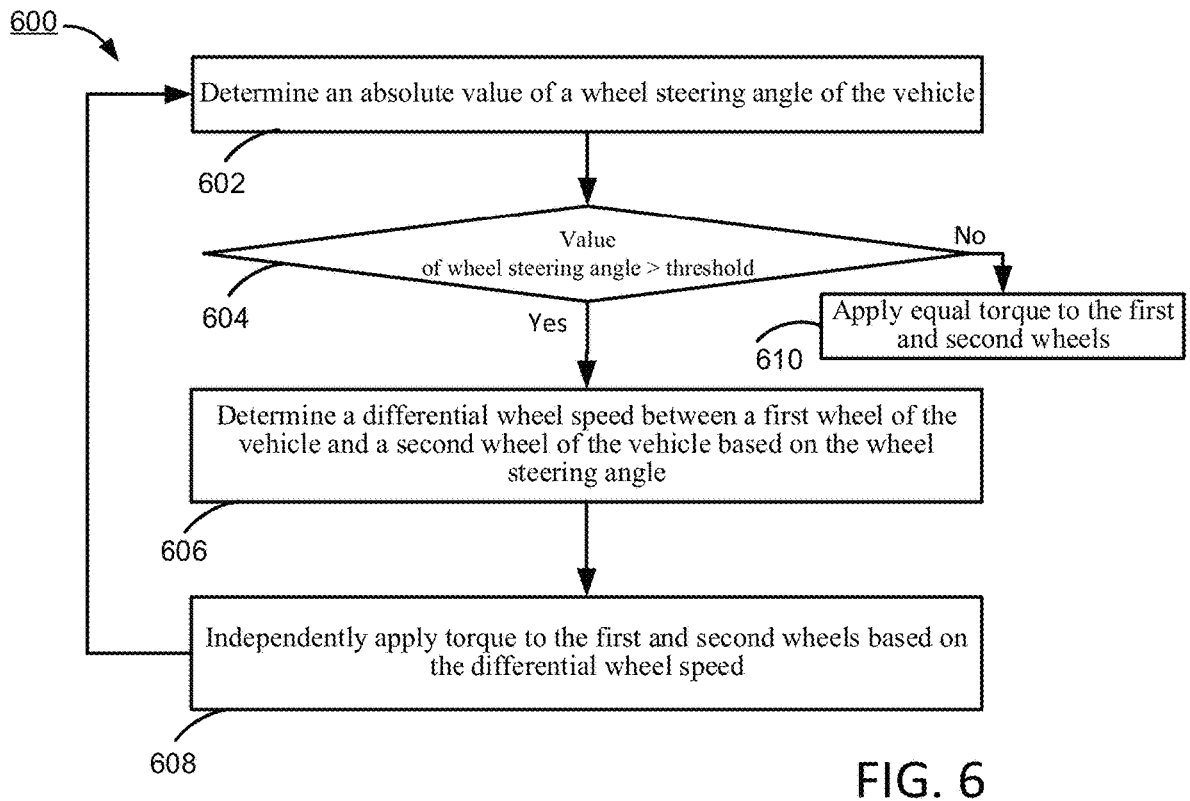
FIG. 6 depicts an illustrative flow diagram of a process for controlling speed differential of wheels of a vehicle by setting a differential speed for wheel, in accordance with some embodiments of the present disclosure.
Figure 7:
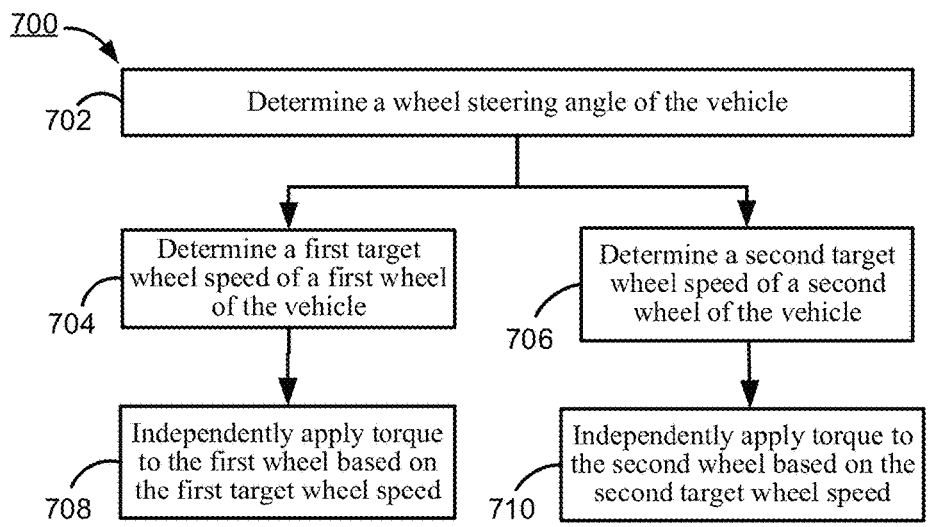
FIG. 7 depicts an illustrative flow diagram of a process for controlling speed differential of wheels of a vehicle by setting a target wheel speed, in accordance with some embodiments of the present disclosure.
Figure 8:
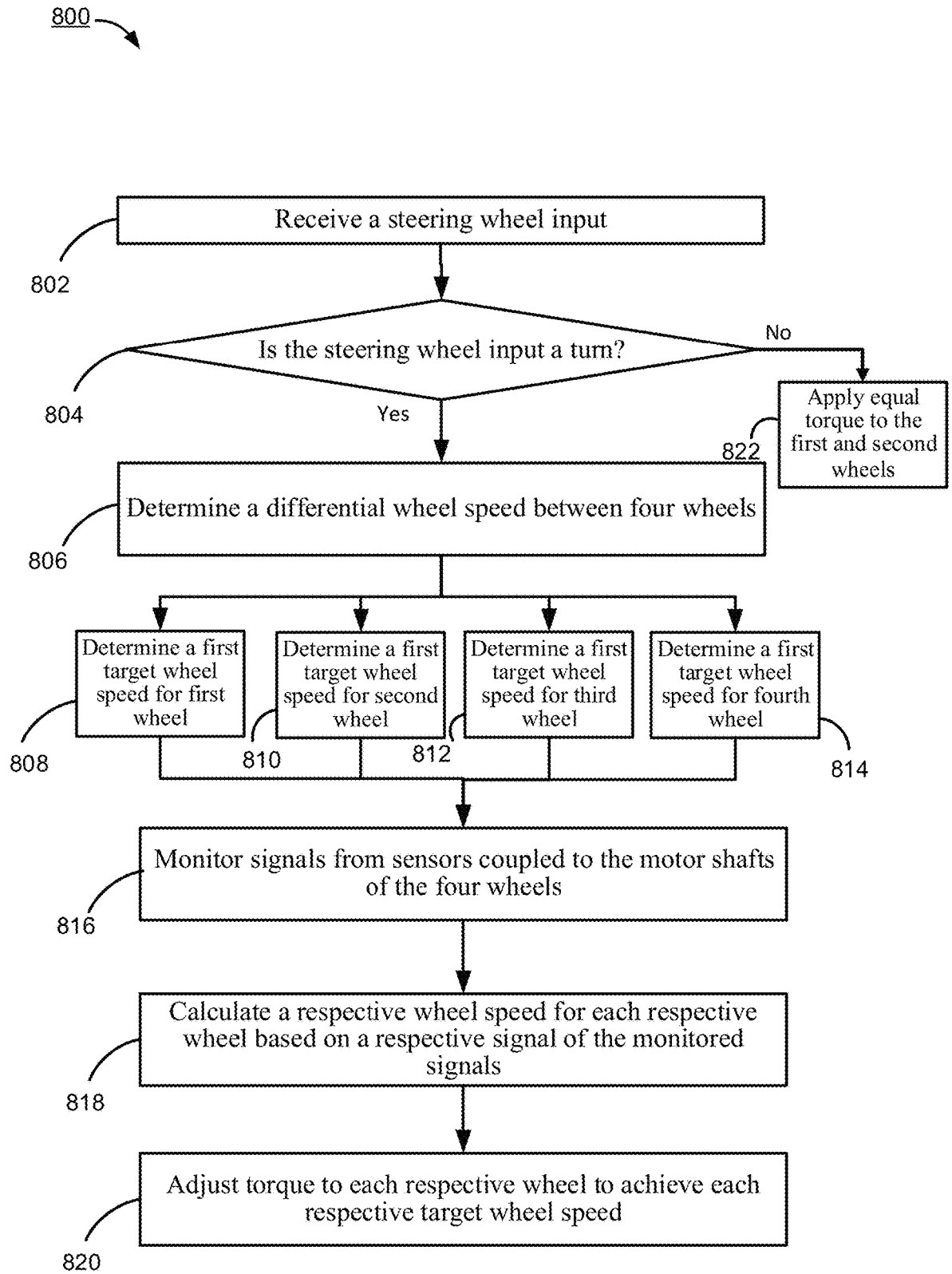
FIG. 8 depicts an illustrative flow diagram of a process for controlling speed differential of wheels of a vehicle by monitoring wheel speed, setting a target wheel speed and adjusting the torque independently to each wheel, in accordance with some embodiments of the present disclosure.

Illustrative system diagram 100 of FIG. 1 may be used to perform any or all of the illustrative steps of processes 600, 700 and 800 of FIGS. 6, 7 and 8, respectively. Illustrative system 100 of FIG. 1 may be used to control any of the wheel/motor configurations shown in FIG. 2, in accordance with the present disclosure. In some embodiments, not all components shown in FIG. 1 need to be included in vehicle 200.

Figure 2:
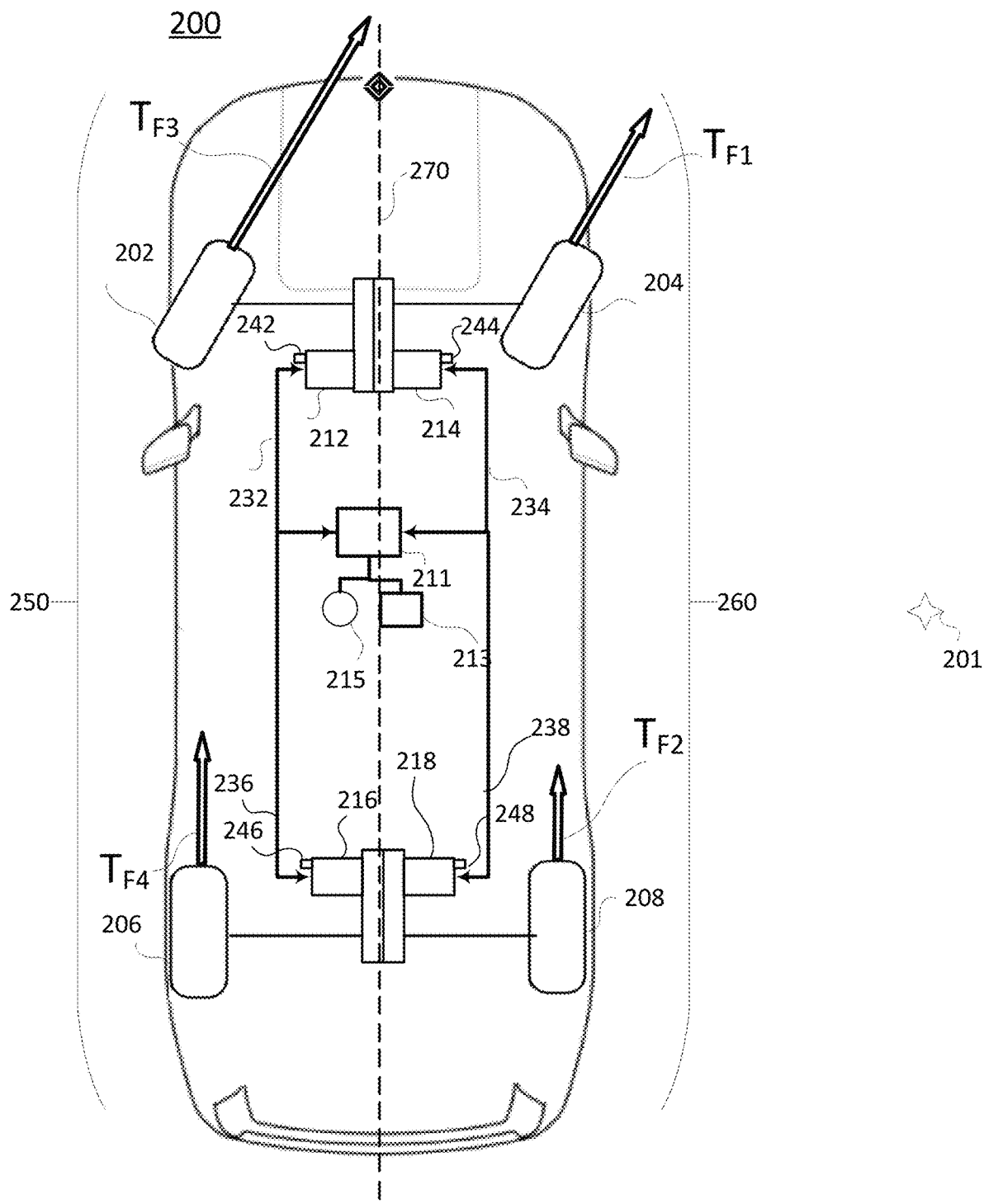
FIG. 2 shows a top cross-sectional view of an illustrative vehicle in accordance with some embodiments of the present disclosure.

FIG. 2 shows a top view of an illustrative vehicle 200 in accordance with some embodiments of the present disclosure. In some embodiments, vehicle 200 may be a coupe, a sedan, a truck, a sport utility vehicle, a delivery van, a full-size van, a minivan, a delivery van, a bus, or any other type of vehicle.

In some embodiments, vehicle 200 may include a front left wheel 202, front right wheel 204, rear left wheel 206, and rear right wheel 208. In some embodiments, vehicle 200 may include a motor 212. Motor 212 may be connected to the front left wheel 202 (e.g., via a belt, chains, gears, or any other connection device). Vehicle 200 may also include motors 214, 216, 218, which are similarly connected to wheels 204, 206, 208, respectively. In some embodiments, motors 212, 214, 216, and 218 may be configured to provide forward torque or backward torque to their respective wheels 202, 204, 206, and 208. In some embodiments, each of the motors 212, 214, 216, and 218 may be a different motor. For example, a first motor 212 may differ from a second motor 216. In some embodiments, vehicle 200 may include an accelerator pedal 213 configured to provide an accelerator pedal input to a vehicle dynamic controller 211 configured to convert the accelerator pedal input to a torque or target wheel speed. In some embodiments, vehicle 200 may include a steering wheel 215 configured to provide a steering wheel angle to a vehicle dynamic controller 211 configured to convert the wheel steering angle to a turn of the vehicle. In some embodiments, vehicle 200 may include a resolver 242 attached at motor 212 and configured to monitor and send a signal from the resolver 242 to the vehicle dynamic controller 211. Further, the vehicle dynamic controller 211 communicates with each resolver 242, 244, 246, 248 coupled at each motor (212, 214, 216, 218) via the respective communications lines (232, 234, 236, 238).

In some embodiments, motors 212, 214, 216, and 218 may be any kind of motors capable of generating power (e.g., gas motors, gas-electric hybrids motors, electric motors, battery-powered electric motors, hydrogen fuel cell motors). In some embodiments, motors 212, 214, 216, and 218 may be battery-powered electric motors configured for vehicle drive, propulsion by utilizing a plurality of battery cells packaged together to create one or more battery modules or assemblies to store energy and release the energy upon request. In some embodiments, motors 212, 214, 216, and 218 may be devices connected to a primary single motor (not shown) and configured to independently transfer power from a single motor to wheels 202, 204, 206, and 208, respectively. For example, motors 212, 214, 216, and 218 may independently transfer power to wheels 202, 204, 206, and 208, respectively, such that wheels 202, 204, 206 and 208 spin in one direction (e.g., forward direction) at different speeds, thereby enabling vehicle 200 to reduce resistance to steering input and provide stability when driving on very low friction surfaces to prevent excessive wheel slip. In some embodiments, the vehicle may include four motors 212, 214, 216, and 218, each configured to independently provide torque to a respective wheel 202, 204, 206 and 208. In some embodiments, the four motors 212, 214, 216, and 218 may be configured to independently provide torque to respective wheels 202, 204, 206 and 208 based on a respective target wheel speed. In some embodiments, the first torque provided to a first wheel differs from the second torque provided to a second wheel.

In some embodiments, vehicle 200 may include processing circuitry 122. In some embodiments, the processing circuitry 122 may include an onboard vehicle computer that is capable of controlling multiple features or capabilities of the vehicles. In some embodiments, processing circuitry 122 may be communicatively connected with user inputs (e.g., graphical user interface 402) of the vehicle 200, sensors of the vehicle, and transitory or non-transitory memory (e.g., memory that stores instructions for operating the vehicle).

In some embodiments, vehicle 200 may include a plurality of sensors. For example, some of the plurality of sensors may include sensors for determining the speed of vehicle 200, the wheel steering angle to which the front wheels 202, 204 of vehicle 200 are turned, vehicle rotation sensor 114 to determine the rotation of the vehicle in a vehicle yaw mode, wheel rotation sensors 112 (e.g., resolvers 242, 244, 246, 248) to determine the wheel speed of each of the wheels 202, 204, 206, and 208 of vehicle 200, and accelerometer sensor 120.

In some embodiments, the processing circuitry 122 of vehicle 200 may be capable of directly controlling features of vehicle 200 with or without user input. In one example, processing circuitry 122 may be able to actuate motor 212 to provide a specified amount of forward torque to front left wheel 202 to achieve a target wheel speed. Similarly, processing circuitry 122 may be able to actuate any of motors 214, 216, 218 to provide a specified amount of backward or forward torque to wheels 204, 206, 208, respectively, to achieve a target wheel speed.

In some embodiments, front left wheel 202 and front right wheel 204 may be connected via a drive shaft (not shown). As shown in FIG. 2, the illustrated vehicle is positioned with each of the wheels at a different distance from the center of rotation 201 of the vehicle, which defines a center of the concentric circles of an illustrative turn by the vehicle. FIG. 2 depicts a vehicle 200 performing a right turn with the front wheels 202 and 204 providing the steering. In some embodiments, the front left wheel 202 receives forward torque based on a lookup table indicating the percentage difference between the front left wheel 202 and rear right wheel 208. However, those skilled in the art will recognize that similar techniques can be used to perform any turn or motion including all wheels receiving torque in the same direction. In some embodiments, when a vehicle 200 is traveling straight, the entire vehicle travels at the same speed. On the other hand, when a vehicle 200 is turning (e.g., receive a steering wheel input), different locations (e.g., wheels 202, 204, 206, 208) on the vehicle will travel at different speeds based on their distances from the center of rotation 201 of the turn. In some embodiments, the differential wheel speed of the wheels is in reference to the vehicle speed. Table 1, reproduced below, shows data of differential wheel speeds between the first wheel and the second wheel based on varying steering wheel angles. In the illustrative example, the first and second wheels are on opposite sides of the vehicle. For example, the first wheel is a front left wheel 202, and the second wheel is a rear right wheel 208. It should be noted that Table 1 is provided for example purposes and should not be interpreted as limiting the present disclosure, as various other relationships between the first wheel, the second wheel and the steering wheel input may be implemented, such as other linear, non-linear, and/or exponential relationships, among other variations contemplated herein.

TABLE 1

| Steering wheel angle (degrees) | % difference | First wheel | Second wheel | Target vehicle speed (mph) |
|---|---|---|---|---|
| 5 | 5 | 5.18 | 4.93 | 5 |
| 10 | 10 | 5.37 | 4.87 | 5 |
| 15 | 20 | 5.75 | 4.75 | 5 |
| 20 | 30 | 6.12 | 4.62 | 5 |
| 25 | 40 | 6.5 | 4.50 | 5 |
| 30 | 50 | 6.87 | 4.37 | 5 |
| 35 | 60 | 7.25 | 4.25 | 5 |
| 40 | 70 | 7.62 | 4.12 | 5 |
| 45 | 80 | 8 | 4 | 5 |

In some embodiments, the first wheel and the second wheel that are driven at different speeds are on the same side of the vehicle. For example, the first wheel is the front right wheel 204 and the second wheel is the rear right wheel 208. Based on the first wheel and the second wheel positioned on the same side of the vehicle, a differential wheel speed is determined corresponding to the travel path of each of the wheels. In some embodiments, the first wheel and the second wheel that are driven at different speeds are in the rear of the vehicle or in the front of the vehicle. Based on the first wheel and the second wheel positioned on the vehicle, a differential wheel speed is determined corresponding to the travel path of each of the wheels.

In some embodiments, when making a right turn, vehicle 200 may provide forward torques ($T_{F3}$ and $T_{F4}$), based on the turning path to achieve the target wheel speed of the vehicle, to the left wheels 250 (e.g., front left wheel 202 and rear left wheel 206). In some embodiments, the vehicle may provide forward torques ($T_{F1}$ and $T_{F2}$) based on the turning path of the wheel to achieve the target wheel speed (e.g., target wheel speed can be proportional to the accelerator pedal input) to the right wheels 260 (e.g., front right wheel 204 and rear right wheel 208). For example, vehicle 200 may provide forward torque $T_{F1}$ to the front right wheel 204, forward torque $T_{F3}$ to the front left wheel 202, forward torque $T_{F4}$ to the rear left wheel 206 and may further provide forward torque $T_{F2}$ to the rear right wheel 208. In some embodiments, the vehicle 200 may provide torques to achieve the target wheel speed (e.g., target wheel speed can be proportional to the accelerator pedal input) to the wheels (e.g., front left wheel 202, front right wheel 204, rear left wheel 206 and rear right wheel 208). In some embodiments, each of the forward torques $T_{F1}$, $T_{F2}$, $T_{F3}$ and $T_{F4}$, are independent torques and are a function of the respective wheel steering angle. For example, a front right wheel 204 may follow a similar travel path as a center location of the vehicle, and therefore may have a low differential speed compared to the vehicle speed and, as a result, requires a small change in torque $T_{F1}$ than torque $T_{F3}$ for the front left wheel 202, which is on a travel path that is larger than the travel path of the vehicle.

In some embodiments, front left wheel 202 and front right wheel 204 may be connected via a drive shaft (not shown). In some embodiments, when making a right turn, vehicle 200 may determine the steering wheel angle for the vehicle—for example, a turn of 30 degrees to the right. Based on the determined steering wheel angle, the vehicle may determine the differential wheel speed for the wheels of the vehicle. For example, a wheel speed for the front left wheel 202 may differ from a wheel speed for the rear right wheel 208. The vehicle may provide independent forward torques ($T_{F3}$ and $T_{F4}$) to the wheels on the left side 250 of the vehicle (e.g., front left wheel 202 and rear left wheel 206). In some embodiments, the vehicle may provide forward torques ($T_{F1}$ and $T_{F2}$) to the wheels on the right side 260 of the vehicle (e.g., front right wheel 204 and rear right wheel 208). For example, the vehicle may provide forward torque $T_{F1}$ to the front right wheel 204 and may further provide forward torque $T_{F2}$ to the rear right wheel 208. In some embodiments, the vehicle may provide forward torques ($T_{F3}$ and $T_{F4}$) to the wheels on the left side 250 of the vehicle (e.g., front left wheel 202 and rear left wheel 206). For example, vehicle 200 may provide forward torque $T_{F3}$ to the front left wheel 202 and may further provide forward torque $T_{F4}$ to the rear left wheel 206.

In some embodiments, the vehicle may provide forward torques ($T_{F1}$, $T_{F2}$, $T_{F3}$ and $T_{F4}$) to be exerted on wheels 202 and 206 on the left side 250 and on wheels 204 and 208 on the right side 260 of the vehicle, respectively. In response to the vehicle 200 receiving a steering wheel input via 211, a center of rotation 201 of the vehicle is determined. The center of rotation is the center of the concentric circles, each representing a travel path of a respective wheel. The travel path of each of the wheels (i.e., the concentric circle) is adjusted based on the steering wheel angle. For example, the higher the degree of steering wheel angle, the vehicle path (e.g., concentric circle) is adjusted with a smaller turning path (i.e., smaller radius of the concentric circles). On the other hand, if only a small turn is made, the vehicle path is adjusted with a larger turning path (i.e., larger radius of the concentric circles). The vehicle may determine a differential speed between a first wheel and a second wheel of the vehicle based on the steering wheel input. For example, based on the vehicle identifying a travel path of the vehicle, the wheels of the vehicle have different travel paths. In a right turn, the front left wheel 202 has a larger travel path than the vehicle center travel path, because of its position on the left side of the vehicle making a right turn, which is larger still than the travel path of the rear right wheel 208 on the right side of the vehicle, which has a smaller travel path. Based on the above example, the vehicle determines a differential wheel speed between the first and second wheels. In the illustrative FIG. 2, the arrows' lengths indicate the amount of torque that is to be applied to the wheels. For example, the left front wheel 202, in a right turn, requires increased forward torque $T_{F3}$, while the rear right wheel 208 requires a reduced forward torque $T_{F2}$. The differential wheel speed between the first wheel (e.g., left front wheel 202) and the second wheel (e.g., rear right wheel 208) is determined based on the respective speeds. For example, while the vehicle is traveling at 5 mph, a wheel speed at the first wheel (e.g., left front wheel 202) may be set to approximately 6.5 mph and a wheel speed at the second wheel (e.g., right rear wheel 208) may be set to approximately 4 mph. For example, on a relatively consistent ground surface, the vehicle 200 follows the vehicle path in which the center of rotation 201 of the vehicle is positioned as the center of the concentric circles and the vehicle maintains the vehicle center travel path while each of the travel paths of the wheels is adjusted to reduced resistance to steering input.

Assuming the forward torques to the right side 260 wheels (204 and 208) and the forward torque to the left side 250 wheels (202 and 206) are maintained, the differential wheel speed between the first wheel and the second wheel reduces resistance to steering input and provides stability when driving on very low friction surfaces to prevent excessive wheel slip.

In some embodiments, vehicle 200 may operate in a particular mode (e.g., crawl mode, yaw mode, etc.) in both turn directions (e.g., right turn and left turn). The mode may be engaged or it may be triggered in response to the occupants of the vehicle requesting this mode. In some embodiments, vehicle 200 may receive an indication of a steering wheel input, i.e., a turn. For example, vehicle 200 may receive an indication of a right turn, which will result in the vehicle turning to the right. In another example, vehicle 200 may receive an indication of a left turn, which will result in the vehicle turning to the left. FIG. 2 depicts a right turn; however, those skilled in the art will recognize that similar techniques can be used to perform a left turn.

The foregoing FIG. 2 is merely illustrative of the principles of this disclosure, and various modifications may be made by those skilled in the art without departing from the scope of this disclosure. The above-described embodiments are presented for purposes of illustration and not of limitation. For example, any combination of motors 212, 214, 216, and 218 and drivetrains may be used in vehicle 200 in accordance with the present disclosure. In some examples, the rear motors 216 and 218 of FIG. 2 may be used in combination with a single front motor 212. According to such a configuration, vehicle 200 includes three motors (one front motor and two rear motors). In another example, a single rear motor 216 may be used in combination with the two front motors 212 and 214 of FIG. 2. According to such a configuration, vehicle 200 includes three motors (two front motors and one rear motor).

Figure 3:
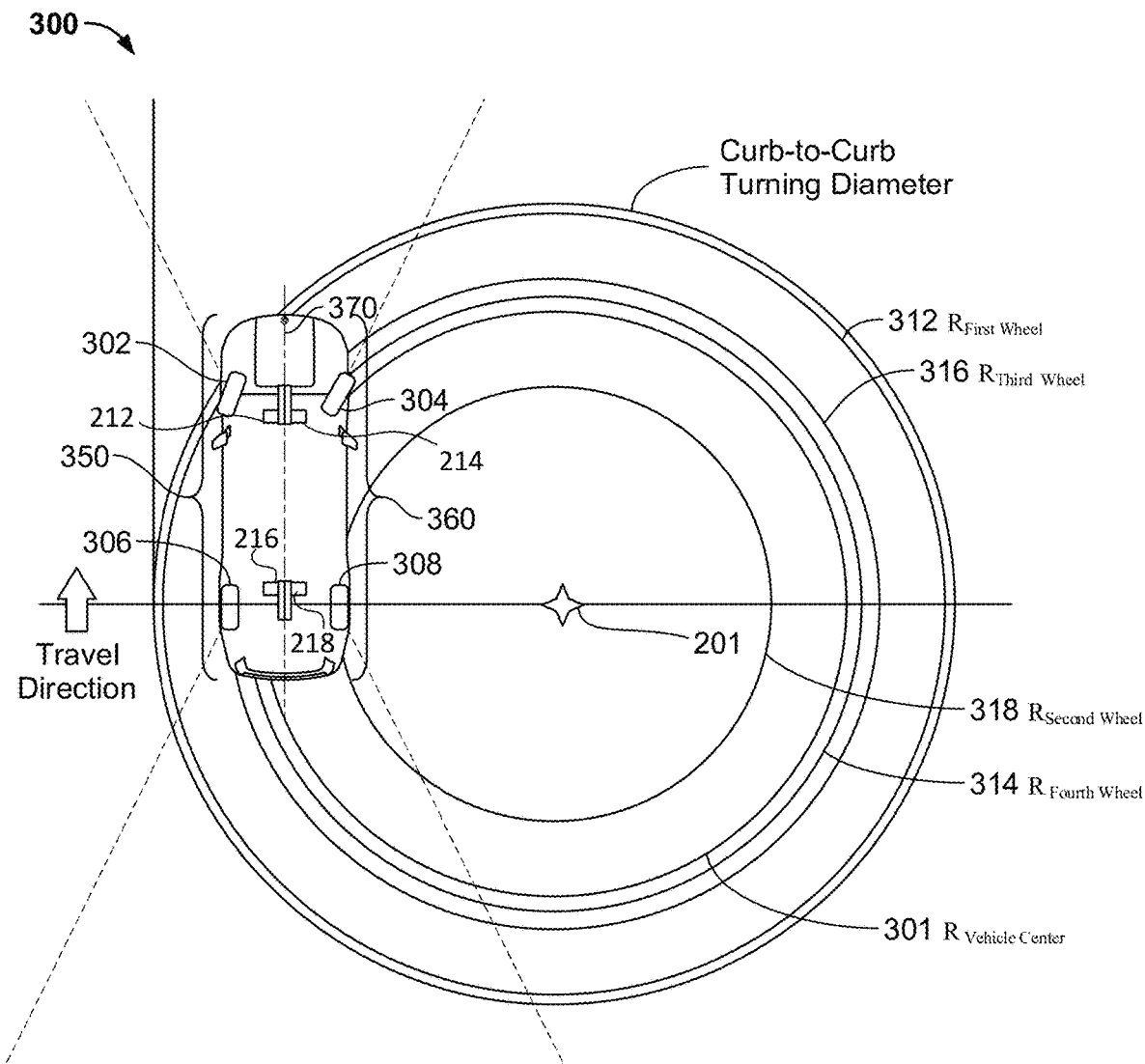
FIG. 3 shows another top cross-sectional view of an illustrative vehicle with the turning path of each wheel illustrated in accordance with some embodiments of the present disclosure.

FIG. 3 shows another top cross-sectional view of an illustrative vehicle with the turning path of each wheel illustrated in accordance with some embodiments of the present disclosure. In some embodiments, vehicle 300 may be a coupe, a sedan, a truck, a sport utility vehicle, a full-size van, a minivan, a delivery van, a bus, or any other type of vehicle.

In some embodiments, vehicle 300 may include a front left wheel 302, front right wheel 304, rear left wheel 306, and rear right wheel 308. In some embodiments, vehicle 300 may include a motor 212. Motor 212 may be connected to the front left wheel 302 (e.g., via a belt, chains, gears, or any other connection device). Vehicle 300 may also include motors 214, 216, 218, which are similarly connected to wheels 304, 306, 308, respectively. In some embodiments, motors 212, 214, 216, and 218 may be configured to provide forward torque or backward torque to their respective wheels 302, 304, 306, and 308.

In some embodiments, motors 212, 214, 216, and 218 may be any kind of motors capable of generating power (e.g., gas motors, electric motors). In some embodiments, motors 212, 214, 216, and 218 may be devices connected to a primary single motor (not shown) and configured to independently and instantaneously transfer power from a single motor to wheels 302, 304, 306, and 308, respectively.

In some embodiments, vehicle 300 may include processing circuitry 122 of FIG. 1. In some embodiments, the processing circuitry 122 may include an onboard vehicle computer that is capable of controlling multiple features or capabilities of the vehicles. In some embodiments, processing circuitry 122 may be communicatively connected with user inputs 102, 104, 105 of the vehicle, sensors of the vehicle 111-120, and transitory or non-transitory memory (e.g., memory that stores institutions for operating the vehicle).

In some embodiments, vehicle 300 may include a plurality of sensors. For example, some of the plurality of sensors may include speed sensor 118 for determining speed of vehicle 300, the steering wheel angle sensor 121 to which the front wheels 302, 304 of vehicle 300 are turned, vehicle rotation sensor 114 to determine the rotation of the vehicle 300 in the vehicle yaw mode, wheel rotation sensors 112 to determine the slipping of each of the wheels 302, 304, 306, and 308 of vehicle 300, and accelerometer sensor 120 to determine the acceleration of the vehicle.

In some embodiments, the processing circuitry 122 of vehicle 300 may be capable of directly controlling features of vehicle 300 with or without user input. In one example, processing circuitry 122 may be able to actuate motor 212 to provide a specified amount of backward or forward torque to the front left wheel 302. Similarly, processing circuitry 122 may be able to actuate any of motors 214, 216, 218 to provide a specified amount of backward or forward torque to wheels 304, 306, 308, respectively.

In some embodiments, the processing circuitry 122 of vehicle 300 may control the speed differential of wheels of a vehicle when one or more conditions are met. For example, a user may press a button, turn the steering wheel or turn a lever to request the vehicle to turn. Yet, the control of speed differential of wheels may be engaged without user input. In some embodiments, instead, or in addition to the user request, the processing circuitry 122 may receive an indication of turn of the vehicle 300 that is requested. For example, the vehicle may receive an input for a right turn or left turn. In some embodiments, the processing circuitry 122 may determine whether front wheels 302 and 304 are aligned to be parallel to the vehicle 300. In some embodiments, for the control of speed differential of wheels to activate, wheels 302 and 304 need to be moved from a position aligned to be parallel to the vehicle 300 to not aligned. For the wheel speed differential to reduce resistance to steering input and provide stability in turning the vehicle 300, the speed differential between wheels 302 and 304 may be greater than 10% based on the steering wheel input to counter the varying turning paths of the wheel. In some embodiments, the one or more front wheels 302 and 304 of the vehicle 300 may be the steering wheels. In some embodiments, the one or more rear wheels 306 and 308 of the vehicle 300 may be the steering wheels. In another embodiment, the one or more rear wheels 306 and 308 and the one or more front wheels 302 and 304 may be the steering wheels.

In some embodiments, while operating the vehicle during a turn, the processing circuitry 122 of vehicle 300 may engage control of the speed differential. In the control of speed differential for wheels of the vehicle, the processing circuitry 122 may provide forward torque to right wheels 360, right front wheel 304, and right rear wheel 308 (e.g., by using motors 214 and 218). In some embodiments, the processing circuitry 122 may provide forward torque to the left wheels 350, left front wheel 302 and left rear wheel 306 of vehicle 300, for example, by using motors 212 and 216. While the vehicle 300 turns, the vehicle 300 will maintain a vehicle speed (e.g., 5 mph), but the individual wheel speeds for each of the wheels 302, 304, 306, and 308 of vehicle 300 will vary based on the geometry of the vehicle (e.g., wheelbase, track of the vehicle, and turning angle of the tires.

In some embodiments, controlling the differential wheel speed between the wheels may be utilized when the vehicle is moving over a large rock or boulder and one of the wheels becomes airborne. In some embodiments, the speed control mode is automatically engaged in response to one or more wheels of the plurality of wheels of the vehicle spinning. For example, as the vehicle goes over a large rock or boulder and one of the wheels becomes airborne, the processing circuitry 122 may automatically engage the speed control mode. The processing circuitry 122 may control each wheel's speed to rotate at the same speed when driving straight. The processing circuitry 122 will adjust the differential wheel speeds according to the turning angle to make it easier for the vehicle to turn.

The foregoing FIG. 3 is merely illustrative of the principles of this disclosure, and various modifications may be made by those skilled in the art without departing from the scope of this disclosure. The above-described embodiments are presented for purposes of illustration and not of limitation. FIG. 3 further shows travel paths of the center of the vehicle around a center of rotation 201, and each of the wheels of the vehicle, based on the steering wheel angle. In some embodiments, vehicle 300 may include a vehicle center of rotation 201, which is a center of the concentric circles each circle representing a travel path of the respective wheel) of the vehicle. Based on the steering wheel angle, the processing circuitry 122 determines a front left travel path 312 for the front left wheel 302, a front right travel path 314 for the front right wheel 304, a rear left travel path 316 for the rear left wheel 306, and a rear right travel path 318 for rear right wheel 308. For example, the processing circuitry 122 can determine the turning radius of each of the wheel travel paths (distance from the wheel to the center of rotation 201) based on the steering wheel angle.

In some embodiments, the vehicle yaw mode may be used on a vehicle with any combination of axles in accordance with the present disclosure. For example, vehicle 300 may have a steered axle and a non-steered axle. The steered axle may be coupled to one wheel or a plurality of wheels that will steer the vehicle 300 in a direction. In some embodiments, the steered axle may be provided at the front or rear of the vehicle 300. For example, as the user provides an input to steer the vehicle, the front or rear wheels will turn. In some embodiments, the non-steered axle may be coupled to one wheel or a plurality of wheels that will provide torque to the vehicle. In some embodiments, the vehicle may provide two axles (e.g., steered and non-steered axles), as shown in the configuration displayed in vehicle 300 (FIG. 3). In some embodiments, the vehicle may provide three or more axles. For example, the three or more axles may provide at least one steered axle and two or more non-steered axles. According to such a configuration, when the at least one steered axle is turned such that the corresponding wheels are aligned to be parallel to the vehicle, the vehicle yaw mode may be engaged. In some embodiments, the at least one steered axle may include a motor at each wheel. In some embodiments, each motor may provide forward torque to the vehicle on one wheel and backward torque to the vehicle at the other wheel attached to the steering axle. In some embodiments, the two or more non-steered axles may provide backward torque on the same side of the vehicle corresponding to backward torque of steering axle, and provide forward torque on the same side of the vehicle corresponding to forward torque of the steering axle, in accordance with the present disclosure.

In some embodiments, the wheel speed differential control or any other mode or no mode at all, can be used in any vehicle capable of distributing torque and/or braking to the wheels of the vehicle. For example, the vehicle may provide for independent distributing of torque to the right wheels 260 and the left wheels 250. According to another example, the vehicle may provide for independent and varying levels of distribution of torque and braking to the right wheels 260 and the left wheels 250. The foregoing enables a driver to have an accurate speed differential which reduces resistance to steering input control while the vehicle travels along the center travel path.

Figure 4:
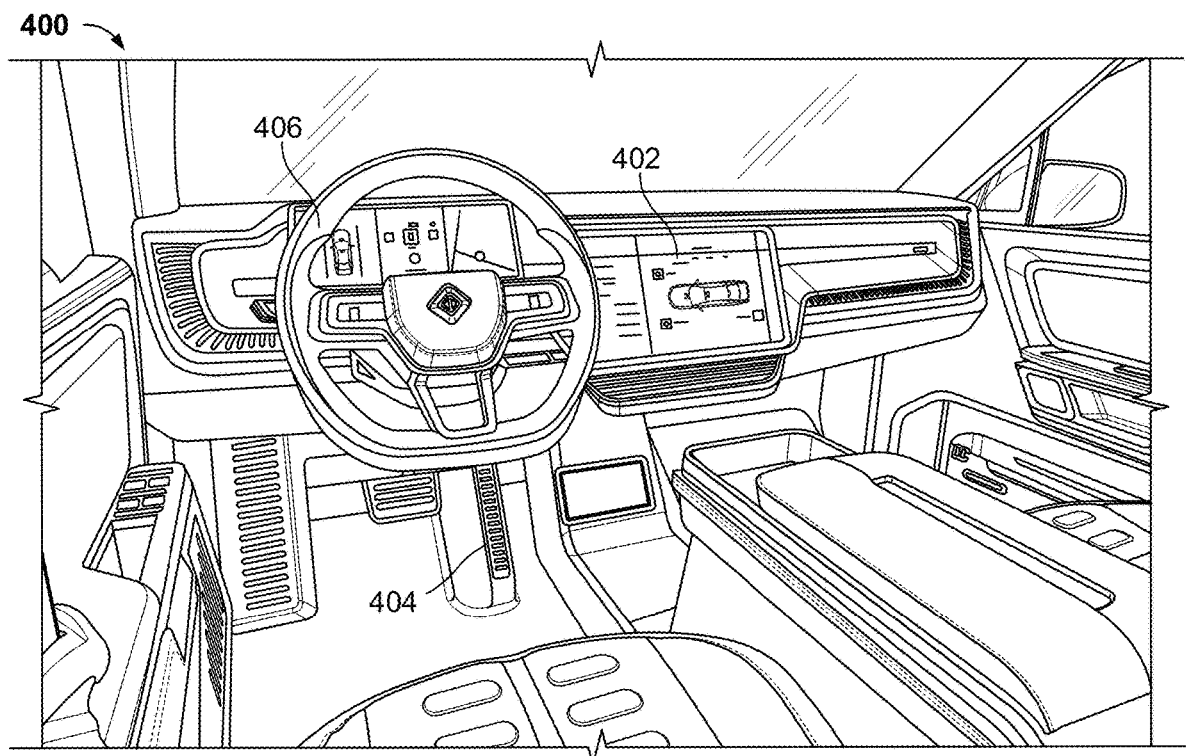
FIG. 4 depicts an illustrative example of an interior of a vehicle featuring a graphical user interface, accelerator pedal input and steering wheel input, in accordance with some embodiments of the present disclosure.

FIG. 4 depicts an illustrative example of an interior of vehicle 400 featuring a graphical user interface 402, in accordance with some embodiments of the present disclosure. In some embodiments, a graphical user interface 402 may refer to components incorporated into, coupled to, or accessible by a vehicle such as a vehicle 400 in FIG. 4. The vehicle 400 is equipped with a graphical user interface 402 that may be used to enable/disable vehicle systems including options to enable and disable control of speed differential or any other mode. For example, a user in vehicle 400 may use the graphical user interface 402 to access options on vehicle 400. The vehicle 400 is further equipped with an accelerator pedal 404, configured to cause torques to be provided to achieve the target wheel speeds (e.g., target wheel speed can be proportional to the accelerator pedal input) of the wheels (e.g., front left wheel 202, front right wheel 204, rear left wheel 206 and rear right wheel 208). The vehicle 400 is also equipped with a steering wheel 406 configured to provide steering to the vehicle. The rotation of steering wheel 406 can be used by the processing circuitry (e.g., the processing circuitry 122 of vehicle 100 or 200) to determine the steering wheel angle. In some embodiments, the graphical user interface 402 may be incorporated into vehicle 400 or user equipment used to access such vehicle system while using vehicle 400. In some embodiments, vehicle systems displayed on the graphical user interface 402 may be communicatively connected with user inputs (e.g., microphone and speakers for providing voice command) of the vehicle 400. For example, the user may provide a voice command to activate the control of speed differential and the audio system incorporated into vehicle 400 may convert such a command to engage the mode.

Figure 5:
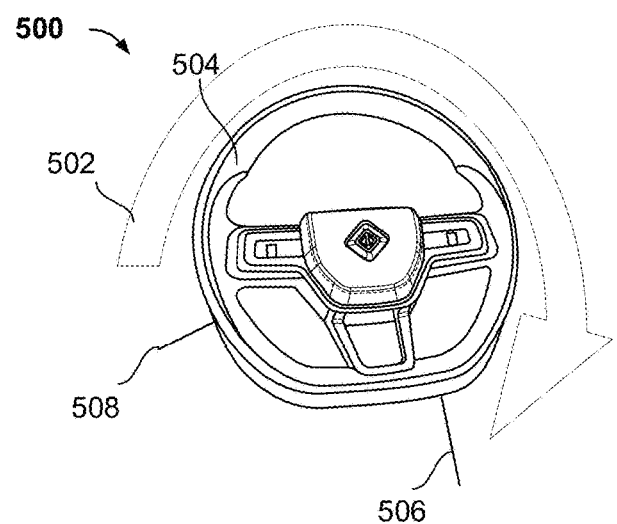
FIG. 5 depicts an example of a steering wheel input for engaging differential speed control, in accordance with some embodiments of the present disclosure.

FIG. 5 shows a front view of an illustrative steering wheel 500 of a vehicle (e.g., vehicle 100 or 200) in accordance with some embodiments of the present disclosure. In some embodiments, steering wheel 500 may include the first threshold 506 (e.g., half revolutions). If the rotation 502 of the steering wheel 500 did not reach the first threshold 506, the vehicle may operate in a normal mode without controlling the speed differential of the wheels of the vehicle. In some embodiments, the first threshold 506 may have an associated false stop. For example, when the user rotates the steering wheel 500 to the first threshold 506, the user may experience resistance (e.g., provided by springs, a detent, or any other type of mechanism). In some embodiments, if the user rotates the steering wheel 500 past the first threshold 506 (e.g., by overcoming the false stop resistance), the processing circuitry 122 may begin operating the vehicle in speed differential.

In some embodiments, the steering wheel 500 may include a second threshold 508 (e.g., 2 full revolutions). In some embodiments, the second threshold 508 is optional, and the overcompensation mode may be activated using other techniques. For example, the second threshold 508 may be present in vehicles where steering wheel 500 is not mechanically connected to the wheels of the vehicle (e.g., in a drive-by-wire vehicle). The overcompensation mode may be triggered when a sharp turn is initiated that results in resistance to each wheel. As part of the overcompensation mode, the vehicle may further apply a break to the wheels of the vehicle to achieve the differential wheel speeds. In some embodiments, the vehicle, while in the overcompensation mode, may exaggerate the target wheel speeds to each wheel to decrease the turning radius and increase the differential speed. For example, the differential wheel speed can be scaled greater than the calculated amounts. For example, if a left side wheel's target speed (e.g., front left wheel 202) has a target wheel speed of 15% greater than the vehicle speed (e.g., 5 mph), the overcompensation mode may increase this target wheel speed of the front left wheel 202 to a faster target wheel speed (e.g., 30% greater). Similarly, if the right side wheel when making a right turn (e.g., rear right wheel) is at 85% of the vehicle speed (e.g., 5 mph), the overcompensation mode may decrease the wheel speed even further to 70% of vehicle speed. Such overcompensation will cause the left side wheel (e.g., front left wheel 202) to over spin and the right side wheel (e.g., rear right wheel 208) to under spin causing additional rotation to the vehicle.

It will be understood that during a non-skidding turn in the normal driving mode, the center of rotation is defined by the spatial arrangement of the wheels and the steering wheel angles of the front wheels. As the steering wheel is turned further away from its center position, the center of rotation of the vehicle moves closer to the vehicle. In some embodiments, while employing the overcompensation mode discussed above, the control of the speed differential enables the center of rotation to move closer to the vehicle than is possible by the angle of the front wheels alone because of the resistance on the wheels. In some embodiments, the amount the steering wheel is turned past the first threshold adjusts the turning path of the vehicle. Based on adjusting the turning path of the vehicle, the turning path for each wheel is adjusted and which results in the speed differential being adjusted for the wheels of the vehicle. For example, as the vehicle makes a further turn, to counter the increased resistance to the front left wheel 202 and rear right wheel 208 of the vehicle, the processing circuitry 122 adjusts the torque to each wheel based on the steering wheel input.

In some embodiments, the amount the steering wheel is turned past the second threshold controls the distance from the path of each wheel to the position of the center point (i.e., center of the concentric circles each circle representing a travel path of the respective wheel) of the vehicle. For example, when the steering wheel is turned past the second threshold, backward torque may begin to be applied to the rear right wheel 208 as part of the overcompensation. The relative amount of backward torque on the rear right wheel 208 may increase relative to the amount of forward torque applied to the front left wheel 202 as the amount the steering wheel is turned past the second threshold increase. When the steering wheel is turned to its maximum amount, the backward torque applied to the rear right wheel 208 may be approximately equal to the forward torque applied to the front left wheel 202.

FIG. 6 depicts an illustrative flow diagram of a process 600 for controlling speed differential of wheels of a vehicle by setting a differential speed for wheel in accordance with several embodiments of the disclosure. In some embodiments, process 600 may be executed by processing circuitry 122 of vehicle 200 (FIG. 2) or 300 (FIG. 3). It should be noted that process 600 or any step thereof could be performed on, or provided by, the system of FIG. 1. In addition, one or more steps of process 600 may be incorporated into or combined with one or more other steps described herein.

Process 600 begins at 602, where the processing circuitry 122 may determine the wheel steering angle of the vehicle. For example, the processing circuitry 122 may use signals from the steering wheel angle sensors 121 to monitor the wheel steering angle and monitor for user inputs via an input on a steering wheel 406 or any other input. For example, referring back to FIG. 3, whether a turn amount or angle of the front wheels of the vehicle is satisfied (e.g., the turn angle of wheels 202 and 204)). In some embodiments, the processing circuitry 122 may use a steering wheel angle sensor 121 connected to a steering column to determine the steering wheel angle of wheels 202 and 204.

Process 600 continues at 604, where the processing circuitry 122 determines if the value of the steering wheel angle is greater than the threshold. For example, the threshold for the steering wheel angle may be set to 5 degrees or any other value. If, the processing circuitry 122 determines that the value of the steering wheel angle is greater than the threshold ("Yes" at 604), then, the processing circuitry 122 proceeds to step 606. If, on the other hand, the processing circuitry 122 determines that the value of the steering wheel angle is below the threshold ("No" at 604), then at 610, the vehicle may apply equal torque to the first and second wheels.

Process 600 continues at 606, where the processing circuitry 122 may proceed depending on the outcome of step 604. At 606, the processing circuitry 122 may determine a differential wheel speed between a first wheel of the vehicle and a second wheel of the vehicle based on the wheel steering angle. In some embodiments, the first wheel may be selected from any one of wheels 202, 204, 206, and 208 and the second wheel is another wheel from the one of wheels 202, 204, 206, and 208 not selected for the first wheel. The differential wheel speed may be determined based on the turning path of each of the selected wheels.

In some embodiments, when the vehicle is turning, the vehicle speed is maintained and a differential wheel speed compares two wheel speeds, for example, the first wheel speed and the second wheel speed, as illustrated by Equation 2 below. In some embodiments, the differential wheel speed compares any of the wheels, as illustrated by exemplary equations as follows:

$$\text{Speed Differential between 1}^{st}\text{ and 2}^{nd}\text{ Wheels} = R_{1st\ Wheel}/R_{2nd\ Wheel} \quad (\text{Eq. 1})$$

$$\text{Speed Differential between 1}^{st}\text{ and 3}^{rd}\text{ Wheels} = R_{1st\ Wheel}/R_{3rd\ Wheel} \quad (\text{Eq. 2})$$

$$\text{Speed Differential between 1}^{st}\text{ and 4}^{th}\text{ Wheels} = R_{1st\ Wheel}/R_{4th\ Wheel} \quad (\text{Eq. 3})$$

Where $R_{1st\ Wheel}$ is the turning radius of the first wheel of the vehicle, $R_{2nd\ Wheel}$ is the turning radius of the second wheel of the vehicle, $R_{3rd\ Wheel}$ is the turning radius of the third wheel of the vehicle, and $R_{4th\ Wheel}$ is the turning radius of the fourth wheel of the vehicle.

In some embodiments, when the vehicle is turning, the vehicle speed is maintained and compares a differential wheel speed by comparing each wheel speed to the vehicle speed, as illustrated by exemplary equations as follows:

$$\text{Speed Differential between 1}^{st}\text{ wheel and Vehicle center} = R_{1st\ Wheel}/R_{Vehicle\ Center} \quad (\text{Eq. 4})$$

$$\text{Speed Differential between 2}^{nd}\text{ wheel and Vehicle center} = R_{2nd\ Wheel}/R_{Vehicle\ Center} \quad (\text{Eq. 5})$$

$$\text{Speed Differential between 3}^{rd}\text{ wheel and Vehicle center} = R_{3rd\ Wheel}/R_{Vehicle\ Center} \quad (\text{Eq. 6})$$

$$\text{Speed Differential between 4}^{th}\text{ wheel and Vehicle center} = R_{4th\ Wheel}/R_{Vehicle\ Center} \quad (\text{Eq. 7})$$

Where $R_{1st\ Wheel}$ is the turning radius of the first wheel of the vehicle, $R_{2nd\ Wheel}$ is the turning radius of the second wheel of the vehicle, $R_{3rd\ Wheel}$ is the turning radius of the third wheel of the vehicle, $R_{4th\ Wheel}$ is the turning radius of the fourth wheel of the vehicle and $R_{Vehicle\ center}$ is the turning radius of the center of the vehicle.

The foregoing equations (Eq. 2-8) are merely illustrative of the principles of this disclosure, and various modifications may be made by those skilled in the art without departing from the scope of this disclosure. The above-described embodiments are presented for purposes of illustration and not of limitation. For example, any combination of differential values can be stored in a lookup table and retrieved based on the turn angle and applied to the appropriate wheels based on the turn direction.

In some embodiments, as part of performing the turn, the processing circuitry 122 may determine the turn direction (e.g., a right or left turn is performed). In some embodiments, the processing circuitry 122 may determine the first wheel and the second wheel based on the turning path of the vehicle. For example, in response to receiving a wheel steering angle for a right turn, the processing circuitry 122 determines that the front left wheel (202) is the first wheel and the rear right wheel (208) is the second wheel. In another example, in response to receiving a wheel steering angle for a right turn, the processing circuitry 122 determines that the front left wheel (202) is the first wheel and the front right wheel (204) is the second wheel. Any possible combination of wheels 202, 204, 206, and 208 may be determined to be the first wheel and the second wheel of the vehicle.

At 608, the processing circuitry 122 may independently apply torque to the first wheel and the second wheel based on the differential wheel speed. For example, if the differential wheel speed is 40%, each of the first and second wheels is adjusted such that the torque that is output is approximately 40% different between the first wheel and the second wheel. If the vehicle is traveling at 5 mph, the torque applied to the first wheel may be increased to raise the wheel speed to approximately 6 mph, while the torque applied to the second wheel may be decreased to lower the wheel speed to approximately 4.25 mph. In some embodiments, the differential speed is determined based on the first wheel. In another embodiment, the differential speed is determined based on the second wheel. In yet another embodiment, the differential wheel speed is determined based on a vehicle target speed, for example, 5 mph. In the above-mentioned embodiments, the processing circuitry 122 may actuate motors 212 and 218 to provide independent torque to wheels 202 and 208. Further, the processing circuitry 122 may actuate motors 214 and 216 to provide independent torque to wheels 204 and 206. In some embodiments, step 606 is performed in response to a user turning the steering wheel or in response to a user pressing an option on a graphical user interface 402 of the vehicle. In some embodiments, step 606 starts independently adjusting torque to the wheels based on monitoring of sensor data. For example, torque independently adjusts regardless of the accelerator pedal input. Generally, the torque is increased until the speed differential for the first and second wheel is achieved, and as a result, the vehicle reduces the resistance while performing a turn. In some embodiments, the processing circuitry 122 continues to check the wheel steering angle to determine the differential wheel speed. Based on increasing the wheel steering angle, the processing circuitry 122 determines a new differential wheel speed between the first and the second wheels and independently adjusts the torque applied to the first and the second wheel. For example, upon applying torque to the first and second wheels based on a first differential speed (e.g., between the first wheel and the second wheel) and a steering wheel input of 10 degrees, the processing circuitry 122 may restart at 602 and determine a second differential speed (e.g., between the first wheel and the second wheel) based on a steering wheel input of 20 degrees.

FIG. 7 depicts an illustrative flow diagram of a process 700 for controlling the speed differential of wheels of a vehicle by setting a target wheel speed. In some embodiments, process 700 may be executed by processing circuitry 122 of vehicle 200 (FIG. 2) or 300 (FIG. 3). It should be noted that process 700 or any step thereof could be performed on, or provided by, the system of FIG. 1. In addition, one or more steps of process 700 may be incorporated into or combined with one or more other steps described herein.

Process 700 begins at 702; similar to step 602, the processing circuitry 122 may determine the wheel steering angle of the vehicle. The wheel steering angle affects the center of rotation of the vehicle. For example, the processing circuitry 122 may use signals from the steering wheel angle sensors 121 to monitor the wheel steering angle and monitor for user inputs via an input on a steering wheel 406 or any other input. In some embodiments, the processing circuitry 122 may use a sensor connected to a steering column to determine the steering wheel angle of wheels 202 and 204

Process 700 continues at 704 and 706. Each of these steps may be performed in any order or in parallel or substantially simultaneously to reduce lag or increase the speed of the system or method. At 704, the processing circuitry 122 may determine a first target wheel speed of a first wheel of the vehicle. In some embodiments, the first wheel may be selected from any one of wheels 202, 204, 206, and 208 and the first target wheel speed is determined based on the path of the respective wheel.

At 706, where the processing circuitry 122 may determine a second target wheel speed of a second wheel of the vehicle. In some embodiments, the second wheel may be selected from another wheel of the vehicle other than the first wheel from wheels 202, 204, 206, and 208 and the second target wheel speed is determined based on the path of the respective wheel. In some embodiments, the first and second wheels are at different distances away from the center of rotation defined by the wheel steering angle, and thus the first and second target wheel speeds are different. The different wheel speed targets may be determined based on the turning path of each of the selected wheels. As part of performing the turn, the processing circuitry 122 may determine that a right turn is performed. In some embodiments, the processing circuitry 122 may determine the first wheel and the second wheel based on the turning path of the vehicle. For example, in response to receiving a wheel steering angle for a right turn, the processing circuitry 122 determines that the front left wheel (202) is the first wheel and the rear right wheel (208) is the second wheel. In another example, in response to receiving a wheel steering angle for a right turn, the processing circuitry 122 determines that the front left wheel (202) is the first wheel and the front right wheel (204) is the second wheel. Any possible combination of wheels 202, 204, 206, and 208 may be determined to be the first wheel and the second wheel of the vehicle.

At 706, the processing circuitry 122 may independently apply torque to the first wheel based on the first target wheel speed. For example, while the vehicle is traveling at 5 mph, the first target wheel speed may be determined to be 6 mph based on the steering wheel angle. In some embodiments, the vehicle is traveling at 5 mph when going straight (i.e., wheel steering angle is "0" and all wheels generally turn at the same speed), and in response to determining a change to the steering wheel angle, the torque applied to the first wheel may be increased to raise the wheel speed to the first target wheel speed of 6 mph. At 708, the processing circuitry 122 may independently apply torque to the second wheel based on the second target wheel speed. In some embodiments, the torque applied to the second wheel may be decreased to lower the wheel speed to approximately 4.25 mph. For example, in response to receiving an indication of a right turn, the processing circuitry 122 determines that the left side wheels (202 and 206) are the outer wheels and the right-side wheels (204 and 208) are the inner wheels. In another example, in response to receiving an indication of a left turn, the processing circuitry 122 determines that the left side wheels (202 and 206) are the inner wheels and the right-side wheels (204 and 208) are the outer wheels. In some embodiments, the processing circuitry 122 may provide an independent torque to the left side 250 wheels of the vehicle and to the right side 260 wheels of the vehicle. For example, the processing circuitry 122 may actuate motors 212, 214, 216 and 218 to provide independent forward torque to wheels 202, 204, 206 and 208. In some embodiments, the vehicle may continuously monitor the steering wheel angle and adjust the respective target speeds for wheels of the vehicle based on changes to the steering wheel. For example, after starting a turn, the vehicle steering wheel is turned further, and the target wheel speeds are adjusted accordingly. Thus, the processing circuitry 122 may actuate motors 212, 214, 216 and 218 to adjust the forward torque to wheels 202, 204, 206 and 208 to achieve the travel path of each wheel.

In some embodiments, the vehicle 200 may be a dual-motor vehicle with 2 motors (e.g., 212, 214) in the front of the vehicle. Based on such a configuration, the first wheel could be the front left wheel 202 and the second wheel could be the front right wheel 204. In some embodiments, the dual-motors may be positioned in the rear (e.g., 216, 218) of the vehicle. Based on such a configuration, the first wheel could be the rear left wheel 206 and the second wheel could be the rear right wheel 208. In yet another embodiment, the dual-motors may be configured with a first motor 212 providing power to a first side 250 and a second motor 214 providing power to a second side 260. In some embodiments, the first motor 212 differs from the second motor 214. Based on such a configuration, the first wheel could be the from left wheel 202 and the second wheel could be the front right wheel. The processing circuitry 122 may actuate the dual motors to adjust the forward torque to first wheel and second wheel to achieve vehicle speed along the travel path.

It will be understood that process 700 is merely illustrative and various modifications can be made within the scope of the disclosure. For example, in some embodiments, steps 704 and 708 can also be performed for a third wheel and a fourth wheel as explained in further detail in connection with FIG. 8. In some embodiments, the vehicle includes an independent motor for each wheel. Based on an independent motor, the processing circuitry 122 may perform steps 704 and 708 for each wheel.

FIG. 8 depicts an illustrative flow diagram of a process 800 for controlling the speed differential of wheels of a vehicle by monitoring wheel speed, setting a target wheel speed and adjusting the torque independently to each wheel. In some embodiments, process 800 may be executed by processing circuitry 122 of vehicle 200 (FIG. 2) or 300 (FIG. 3). It should be noted that process 800 or any step thereof could be performed on, or provided by, the system of FIG. 1. In addition, one or more steps of process 800 may be incorporated into or combined with one or more other steps described herein.

Process 800 begins at 802, where the processing circuitry 122 receive a steering wheel input. For example, the operator of the vehicle may rotate the steering wheel, which is configured to provide steering input to wheels 202 and 204.

Process 800 continues at 804, where the processing circuitry 122 determines if the steering wheel input is a turn. For example, the value of the steering wheel angle may be determined to be greater than 0 degrees. If, the processing circuitry 122 determines that the value of the steering wheel angle is greater than 0 degrees (i.e., steering wheel input is a turn) ("Yes" at 804), then, the processing circuitry 122 proceeds to step 806. If, on the other hand, the processing circuitry 122 determines that the value of the steering wheel angle is zero 0 degrees ("No" at 804), then at 822, the processing circuitry 122 may apply equal torque to the first and second wheels. In some embodiments, at 822, the processing circuitry 122 may independently apply torque to the first and second wheels such that they rotate at the same speed (e.g., in a speed control mode).

Process 800 continues at 806, where the processing circuitry 122 may proceed depending on the outcome of step 804 At 806, the processing circuitry 122 may determine a differential wheel speed between the four wheels of the vehicle. For example, the processing circuitry 122 may determine a first differential wheel speed between the first and the second wheels, a second differential wheel speed between a first and the third wheels and a third differential wheel speed between the first and the fourth wheels. Each of the differential wheel speeds is based on the steering wheel angle and can all be different. The differential wheel speed may be determined based on any relevant factors including a ratio between another wheel. In some embodiments, the differential speeds are based on a difference between the center of the concentric circles each representing a travel path of the respective wheel and the respective wheel. In some embodiments, the differential wheel speed can all be relative to one of the wheels (e.g., as a ratio or percentage compared to the front right wheel). In some embodiments, the differential wheel speed can all be relative to the vehicle speed/path (again as either relative or a percentage). In some embodiments, the differential wheel speed may be determined based on a formula as calculated using equations 1-7. In some embodiments, the differential wheel speed may be based on a lookup table as a function of the steering wheel input. In some embodiments, the differential wheel speed may be based on a lookup table as a function of the type of incline, and surface friction the vehicle is on.

Process 800 continues at steps 808-814. Each of these steps may be performed in any order or in parallel or substantially simultaneously to reduce lag or increase the speed of the system or method. In some embodiments, the steps 808-814 may be performed as part of step 806. For example, determining the differential wheel speed may include determining a target wheel speed for each wheel. At 808, the processing circuitry 122 may determine a first target wheel speed of a first wheel of the vehicle. At 810, the processing circuitry 122 may determine a second target wheel speed of a second wheel of the vehicle. At 812, the processing circuitry 122 may determine a third target wheel speed of a third wheel of the vehicle. At 814, the processing circuitry 122 may determine a fourth target wheel speed of a fourth wheel of the vehicle. In some embodiments, the first, second, third and fourth wheels may be any one of wheels 202, 204, 206, and 208. In some embodiments, each of the first, second, third and fourth target wheel speeds is determined based on the travel path of the respective wheel. For example, if the different wheel speeds are a ratio compared to the vehicle speed, then the target wheel speed for a wheel is equal to the vehicle speed multiplied by the differential wheel speed ratio for that wheel. In another example, if the different wheel speeds are a factor from a lookup table, as compared to the vehicle speed, then the target wheel speed for a wheel is equal to the vehicle speed multiplied by the factor for each wheel based on the geometry of the vehicle.

In some embodiments, at 816, the processing circuitry 122 may monitor signals from sensors coupled to the motor shafts of the four wheels to determine the wheel speed of the wheels. In some embodiments, the processing circuitry 122 may monitor signals from the resolvers 112 to determine the wheel speed. The wheel speed can be determined by calculating the number of rotations of the wheel over time. In yet another embodiment, the resolvers may generate an alternating circuit (AC) signal. The AC signal generates an electrical waveform that is created when the amplitude or the amount of the signal is varied proportional to the sine of the angle through which the resolver is rotating at any given instant in time. That is, a full rotation of wheel may be identified using the AC signal. Based on the AC signal, the processing circuitry 122 may determine the wheel speed for each wheel more precisely. In some embodiments, the processing circuitry 122 may be communicatively connected to one or more speed sensors 118 that provide data indicative of the speed of the vehicle. For example, speed sensors 118 of FIG. 1 may provide data indicative of the speed of the vehicle 200. In another example, the resolvers 112 may provide data indicative of the speed of each wheel of vehicle 200, which may be extrapolated to the speed of the vehicle, e.g., an average of the two front wheels 202, 204 or a function of all of the wheel speeds based on steering angle.

In some embodiments, the process 800 continues at 818, where the processing circuitry 122 may calculate a respective wheel speed for each respective wheel based on a respective signal of the monitored signals. For example, the wheel speed of each wheel may be calculated based on the monitored signal for that wheel.

In some embodiments, the process 800 continues at 820, where the processing circuitry 122 may independently adjust the torque to each respective wheel to achieve each respective target wheel speed. In some embodiments, the torque applied to the wheel may be increased or decreased to achieve the respective target wheel speed. For example, the target wheel speed of each wheel may be different. In some embodiments, the processing circuitry 122 may actuate motors 212, 214, 216 and 218 to provide independent forward torque to each of wheels 202, 204, 206 and 208. In some embodiments, the vehicle may continuously monitor the steering wheel angle and adjust the respective target speeds for wheels 202, 204, 206 and 208 of the vehicle 200 based on changes to the steering wheel 404. In some embodiments, the processing circuitry 122 may actuate motors 212, 214, 216 and 218 to adjust the forward torque to wheels 202, 204, 206 and 208 to achieve the correct travel path of each wheel.

It will be understood that process 800 is merely illustrative and various modifications can be made within the scope of the disclosure. For example, in some embodiments, steps 808-814 can be omitted and step 806 can be performed in response to the accelerator pedal 213 being pressed. It should also be noted that processes 600, 700 and 800 may be combined sequentially, specific steps from each of the processes 600, 700 and 800 may be combined to establish a separate process, among other possibilities.

It is contemplated that the system, steps or descriptions of each of FIGS. 1-8 may be used with any other embodiment or embodiments of this disclosure. One skilled in the art would appreciate that some system components, steps or descriptions of each of FIGS. 1-8 may be optional and may be omitted in some embodiments. More generally, the disclosure is meant to be exemplary and not limiting. In addition, the steps and descriptions described in relation to FIGS. 6-8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1, 2 and 3 could be used to perform one or more of the steps in FIGS. 6, 7 and 8.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method for controlling speed differential of wheels of a vehicle, the method comprising:
   determining a wheel steering angle of the vehicle;
   in response to determining the wheel steering angle of the vehicle is below a first wheel steering angle threshold, applying equal torque to first and second wheels of the vehicle;
   in response to determining the wheel steering angle of the vehicle exceeds the first wheel steering angle threshold:
      determining a differential wheel speed associated with a first wheel of the vehicle and a second wheel of the vehicle, wherein determining the differential wheel speed comprises:
         determining a first target wheel speed for the first wheel based on the wheel steering angle and vehicle speed; and
         determining a second target wheel speed for the second wheel based on the wheel steering angle and the vehicle speed; and
      independently applying torque to the first and second wheels to achieve the first target wheel speed and the second target wheel speed; and
   in response to determining the wheel steering angle of the vehicle continues to increase and exceeds a second wheel steering angle threshold greater than the first wheel steering angle threshold, providing an overcompensation factor to the first and second wheels.

2. The method of claim 1, wherein:
   determining the differential wheel speed is further based on at least one of 1) a center of rotation, 2) distance of the first wheel to the center of rotation, or 3) distance of the second wheel to the center of rotation; and
   independently applying torque to the first and second wheels comprises:
      applying a first torque to the first wheel to achieve the first target wheel speed; and
      applying a second torque to the second wheel to achieve the second target wheel speed, wherein the first torque differs from the second torque.

3. The method of claim 2, wherein:
   the vehicle comprises a first motor configured to provide the first torque to the first wheel; and
   the vehicle comprises a second motor configured to provide the second torque to the second wheel, wherein the first motor differs from the second motor.

4. The method of claim 1, wherein:
   the vehicle comprises four wheels comprising the first wheel, the second wheel, a third wheel, and a fourth wheel;
   determining the differential wheel speed comprises determining a respective target wheel speed for each of the first wheel, the second wheel, the third wheel, and the fourth wheel; and
   independently applying torque comprises independently applying torque to each of the four wheels based on the respective target wheel speeds.

5. The method of claim 4, wherein the vehicle comprises four motors, each configured to independently provide torque to a respective wheel based on the respective target wheel speeds.

6. The method of claim 5, wherein:
   each of the four motors comprises an electric motor comprising a motor shaft; and
   the method further comprising:
      monitoring signals from sensors coupled to the motor shafts of the four electric motors, wherein each sensor indicates an amount of rotation of a respective motor shaft;
      calculating a respective wheel speed for each respective wheel based on a respective signal of the monitored signals; and
      in response to the calculated respective wheel speed for each respective wheel, adjusting a torque to each respective wheel to achieve each respective target wheel speed.

7. The method of claim 1, further comprising:
   receiving an accelerator pedal input that determines a vehicle target speed, wherein determining the differential wheel speed comprises:
      determining the differential wheel speed between the first wheel of the vehicle and the second wheel of the vehicle based on the vehicle target speed and the wheel steering angle.

8. The method of claim 1, further comprising:
   determining a turning path for each wheel of the vehicle based on the wheel steering angle, wherein the turning path of the vehicle defines a travel path for each wheel of the vehicle; and
   adjusting the differential wheel speed for each respective wheel of the wheels of the vehicle based on the determined respective turning path.

9. The method of claim 1, wherein the first wheel steering angle threshold is at least 5 degrees.

10. A vehicle for controlling speed differential of wheels of the vehicle, the vehicle comprising:
    a steering wheel configured to receive an input from an operator of the vehicle to turn the vehicle, wherein each turn is configured to generate a respective wheel steering angle of the vehicle; and
    control circuitry configured to:
       determine the wheel steering angle of the vehicle from the received input to turn the vehicle;
       in response to determining the wheel steering angle of the vehicle is below a first wheel steering angle threshold, apply equal torque to first and second wheels of the vehicle;
       in response to determining the wheel steering angle of the vehicle exceeds the first wheel steering angle threshold:
          determine a differential wheel speed associated with a first wheel of the vehicle and a second wheel of the vehicle by:
             determining a first target wheel speed for the first wheel based on the wheel steering angle and vehicle speed; and
             determining a second target wheel speed for the second wheel based on the wheel steering angle and the vehicle speed; and
          independently apply torque to the first and second wheels to achieve the first target wheel speed and the second target wheel speed; and
       in response to determining the wheel steering angle of the vehicle continues to increase and exceeds a second wheel steering angle threshold greater than the first wheel steering angle threshold, provide an overcompensation factor to the first and second wheels.

11. The vehicle of claim 10, wherein:
    the control circuitry is configured to determine the differential wheel speed further based on at least one of 1)

a center of rotation, 2) distance of the first wheel to the center of rotation, or 3) distance of the second wheel to the center of rotation; and the control circuitry is configured to independently apply torque to the first and second wheels by:
applying a first torque to the first wheel to achieve the first target wheel speed; and
applying a second torque to the second wheel to achieve the second target wheel speed, wherein the first torque differs from the second torque.

12. The vehicle of claim 11, wherein:
the vehicle comprises a first motor configured to provide the first torque to the first wheel; and
the vehicle comprises a second motor configured to provide the second torque to the second wheel, wherein the first motor differs from the second motor.

13. The vehicle of claim 10, wherein:
the vehicle comprises four wheels comprising the first wheel, the second wheel, a third wheel, and a fourth wheel;
the control circuitry is configured to determine the differential wheel speed by determining a respective target wheel speed for each of the first wheel, the second wheel, the third wheel and the fourth wheel; and
the control circuitry is configured to independently apply torque by independently applying torque to each of the four wheels based on the respective target wheel speeds.

14. The vehicle of claim 13, wherein the vehicle comprises four motors, each configured to independently provide torque to a respective wheel based on the respective target wheel speeds.

15. The vehicle of claim 14, wherein:
each of the four motors comprises an electric motor comprising a motor shaft;
the control circuitry is further configured to:
monitor signals from sensors coupled to the motor shafts of the four electric motors, wherein each sensor indicates an amount of rotation of a respective motor shaft;
calculate a respective wheel speed for each respective wheel based on a respective signal of the monitored signals; and
in response to the calculated respective wheel speed for each respective wheel, adjust a torque to each respective wheel to achieve each respective target wheel speed.

16. The vehicle of claim 10, further comprises:
an accelerator pedal configured to provide an accelerator pedal input that determines a vehicle target speed, wherein the control circuitry is further configured to determine the differential wheel speed by:
determining the differential wheel speed between the first wheel of the vehicle and the second wheel of the vehicle based on the vehicle target speed and the wheel steering angle.

17. A method for controlling speed differential of wheels of a vehicle, the method comprising:
determining a wheel steering angle of the vehicle;
in response to determining the wheel steering angle of the vehicle is below a first wheel steering angle threshold, applying equal torque to first and second wheels of the vehicle;
in response to determining the wheel steering angle of the vehicle exceeds the first wheel steering angle threshold:
determining a first target wheel speed of a first wheel of the vehicle based on the wheel steering angle and vehicle speed;
determining a second target wheel speed of a second wheel of the vehicle based on the wheel steering angle and the vehicle speed; and
independently adjusting torque to the first and second wheels to achieve their respective first and second target wheel speeds; and
in response to determining the wheel steering angle of the vehicle continues to increase and exceeds a second wheel steering angle threshold greater than the first wheel steering angle threshold, providing an overcompensation factor to the first and second wheels.

18. The method of claim 17, wherein the independently adjusting torque comprises:
applying a first torque to the first wheel to achieve the first target wheel speed; and
applying a second torque to the second wheel to achieve the second target wheel speed, wherein the first torque differs from the second torque.

19. The method of claim 18, wherein:
the vehicle comprises a first motor configured to provide the first torque to the first wheel; and
the vehicle comprises a second motor configured to provide the second torque to the second wheel, wherein the first motor differs from the second motor.

20. The method of claim 17, wherein the first and second wheels are at different distances away from a center of rotation and wherein the first target wheel speed differs from the second target wheel speed.

* * * * *